United States Patent [19]

Walter

[11] Patent Number: 5,519,670
[45] Date of Patent: May 21, 1996

[54] WATER HAMMER DRIVEN CAVITATION CHAMBER

[75] Inventor: Bruno H. Walter, North Vancouver, Canada

[73] Assignee: Industrial Sound Technologies, Inc., British Columbia, Canada

[21] Appl. No.: 316,915

[22] Filed: Oct. 3, 1994

Related U.S. Application Data

[63] Continuation-in-part of Ser. No. 936,032, Aug. 25, 1992, Pat. No. 5,459,699.

[51] Int. Cl.⁶ .................................................. H04R 23/00
[52] U.S. Cl. ............................ 367/142; 422/20; 422/128; 588/227; 210/188; 95/260; 96/175; 55/227
[58] Field of Search .................... 210/188; 95/260, 95/175; 55/277; 588/227; 422/20, 128; 367/140, 142

[56] References Cited

U.S. PATENT DOCUMENTS

| | | | |
|---|---|---|---|
| 2,647,846 | 8/1953 | Bagno | 367/142 |
| 3,369,519 | 2/1968 | Bricout | 116/27 |
| 3,376,949 | 4/1968 | Baker et al. | 181/120 |
| 3,409,470 | 11/1968 | Karpovich | 134/1 |
| 3,536,157 | 10/1970 | Anstey | 181/120 |
| 3,690,403 | 9/1972 | Davis | 181/120 |
| 3,764,965 | 10/1973 | McLean et al. | 181/120 |
| 4,131,178 | 12/1978 | Bouyoucos | 181/120 |
| 4,252,210 | 2/1981 | Sodich | 181/119 |
| 4,271,925 | 6/1981 | Burg | 181/120 |
| 4,396,088 | 8/1983 | Bayhi | 181/120 |
| 4,713,277 | 12/1987 | Akiyama et al. | 428/131 |
| 4,830,122 | 5/1989 | Walter | 175/106 |
| 5,009,272 | 4/1991 | Walter | 175/56 |
| 5,079,750 | 1/1992 | Scherbatskoy | 367/85 |
| 5,085,783 | 2/1992 | Feke et al. | 210/748 |
| 5,129,320 | 7/1992 | Fadner | 101/365 |

FOREIGN PATENT DOCUMENTS

| | | |
|---|---|---|
| 1359616 | 3/1964 | France. |
| 620483 | 10/1935 | Germany. |
| 510300 | 4/1976 | U.S.S.R.. |

*Primary Examiner*—J. Woodrow Eldred
*Attorney, Agent, or Firm*—Oyen Wiggs Green & Mutula

[57] ABSTRACT

A cavitation chamber is driven by a hydraulic driving system in which acoustic pulses are generated by repeated water hammers. In the driving system a liquid is pumped through a conduit. The flow of liquid through the conduit is periodically interrupted by a valve. A water hammer is created each time the valve closes. Acoustic pulses produced by the water hammer propagate directly into a cavitation chamber where they are reflected back and forth by acoustically reflective plates. The cavitation chamber may be applied to degas liquids, mix chemicals or slurries, or promote sonochemical reactions. The design generates acoustic pulses efficiently. The acoustic pulses are coupled to the cavitation chamber with minimal losses. The apparatus is rugged and inexpensive when compared to systems which incorporate electromechanical transducers.

23 Claims, 8 Drawing Sheets

WATER HAMMER DRIVEN CAVITATION CHAMBER

RELATED APPLICATION

This application is a continuation-in-part of U.S. patent application No. 07/936,032, filed 8/25/92, entitled Method and Apparatus for Generating High Energy Acoustic Pulses, now U.S. Pat. No. 5,459,699.

FIELD OF THE INVENTION

This invention relates to apparatus for generating intense acoustical fields inside a cavitation chamber. Apparatus according to the invention may be used for cleaning items, promoting chemical reactions, or treating fluids or slurries.

BACKGROUND OF THE INVENTION

Intense ultrasonic fields are used for treating materials in various ways including cleaning surfaces, promoting certain types of chemical reactions, and degassing liquids. Such fields are generally generated by electrically driven piezoelectric or magnetostrictive transducers.

McCord, U.S. Pat. No. 4,618,263 discloses an acoustic cleaner which incorporates a cavitation generator for agitating liquid in an enclosure. The enclosure is provided with a wave reflecting surface for reflecting acoustic waves from the margin of the liquid back into the body of the liquid to reinforce cavitation in the chamber.

Kanazawa, U.S. Pat. No. 4,727,734 discloses an ultrasonic clothes washer. The washer has a metal tub for receiving clothes. Bubbles are introduced into the tub to promote cavitation and to reflect the ultrasound so that all articles in the tub are irradiated with ultrasound.

Prior art cavitation chambers suffer from the disadvantage that it is difficult to efficiently transmit energy from the vibrating face of the transducer into a liquid in a cavitation chamber as acoustic vibrations. Some prior art cavitation chambers attempt to solve this coupling problem by providing the cavitation chamber with walls designed to resonate at the frequency of the transducer. A further disadvantage of prior art cavitation chambers is that the electromechanical equipment for generating high powered acoustic signals with a piezoelectric or magnetostrictive transducer is inherently expensive and inefficient.

SUMMARY OF THE INVENTION

An object of this invention is to provide a robust inexpensive apparatus for treating materials, which may be fluids, slurties or solids, by cavitation.

The invention provides a cavitation chamber apparatus comprising: a driving system; a cavitation chamber comprising a chamber containing a liquid coupled to the hydraulic driving system; and an acoustic coupler between the driving system and the cavitation chamber. The achieving system comprises means for causing a liquid to flow through a first conduit from an upstream end to a downstream end; a valve in the first conduit for selectively, at least substantially and preferably completely, blocking the flow of the liquid, the valve having an open position wherein the flow of the liquid is substantially unimpeded and a closed position wherein the flow is at least substantially blocked, and preferably completely blocked; an actuator for repeatedly: opening the valve; keeping the valve open for a period sufficient to allow said liquid to commence flowing through the first conduit and the valve with sufficient velocity to produce a water hammer within the first conduit when the valve doses; and closing the valve; to produce a continuous series of water hammer acoustic pulses within said first conduit. The acoustic coupler comprises a second conduit having a first end connected to the first conduit upstream from the valve and a second end connected to an interior region of the cavitation chamber.

A preferred embodiment of the invention further provides an aspirator in the first conduit. The second conduit is connected to a suction port of the aspirator. The aspirator serves to reduce the pressure within the cavitation chamber when fluid is flowing in the conduit. The aspirator preferably comprises an inlet upstream from an outlet, a nozzle coupled to the inlet and directed into the outlet, and an annular space around the nozzle. The second conduit is in fluid communication with the annular space.

Another aspect of the invention provides a method for treating a material. The method comprises the steps of: providing a chamber and a conduit; acoustically coupling a point in the conduit to an interior region in the chamber; providing opposed acoustically reflective on at least two sides of the region; placing the material in the region; causing a liquid to flow through the conduit; suddenly blocking the conduit a distance D downstream from the point to cause a water hammer in the liquid within the conduit; allowing a water hammer acoustic pulse to propagate into the chamber; repeatedly reflecting acoustic waves generated by the pulse between the reflective surfaces to cause cavitation in the region; and repeating steps (e) (f) (g) and (h) until the material has been sufficiently treated by the cavitation.

BRIEF DESCRIPTION OF THE DRAWINGS

In drawings which illustrate specific embodiments of the invention, but which should not be construed as restricting the sprint or scope of the invention in any way.

DETAILED DESCRIPTION OF PREFERRED EMBODIMENTS OF THE INVENTION

Figure 1:
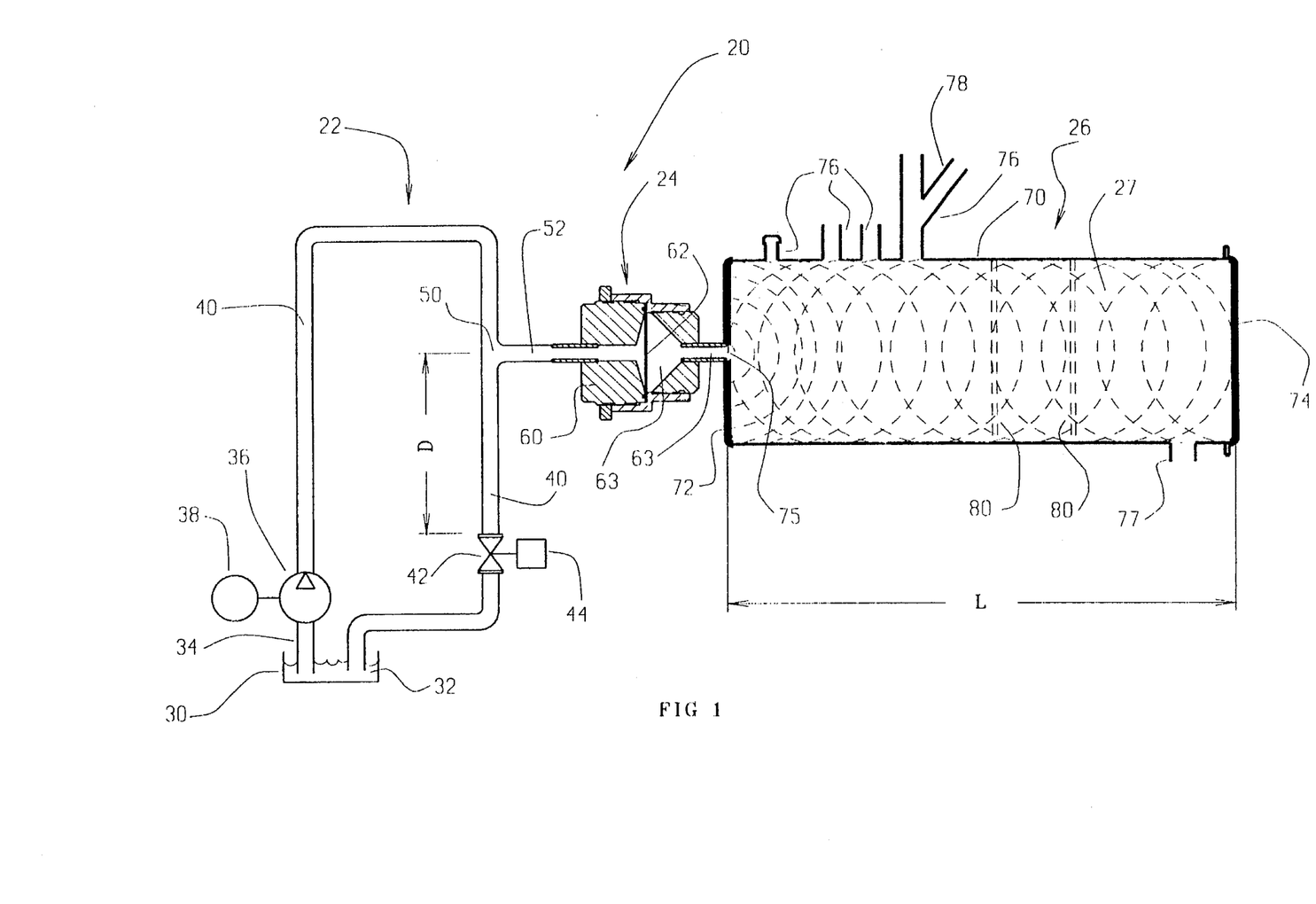
FIG. 1 shows a cavitation chamber according to the invention.

As shown in FIG. 1, cavitation system 20 comprises a hydraulic driving system 22, an optional fluid isolator 24, and a cavitation chamber 26. Hydraulic driving system 22 generates high intensity acoustic pulses. Fluid isolator 24 conveys those acoustic pulses to cavitation chamber 26 and prevents fluid 27 in cavitation chamber 26 from commingling with working fluid 32 in driving system 22. Cavitation chamber 26 confines a fluid 27 (which may also be a slurry) to be treated and causes the acoustic pulses generated by driving system 22 to pass repeatedly through fluid 27.

Hydraulic driving system 22 comprises a reservoir 30 containing a working fluid 32. Working fluid 32 may be any suitably inert and non-compressible fluid, such as water, hydraulic fluid, or the like. Working fluid 32 may be the same as fluid 27, in which case fluid isolator 24 may not be necessary. In the alternative, working fluid 32 may be a different fluid characterized by a high cavitation threshold. If working fluid 32 is different from fluid 27 then working fluid 32 and fluid 27 preferably have similar acoustic properties so that pulses generated by driving system 22 are transmitted efficiently through fluid isolator 24 into chamber 26. The creation of acoustic pulses for doing work by the generation of water hammer in a conduit is discussed in some detail in co-pending U.S. patent application No. 07,936,032 which is incorporated herein by reference.

Working fluid 32 is drawn into a conduit 34 by a pump 36 which is driven by a motor 38. Pump 36 may be, for example, a centrifugal pump. The outlet of pump 36 is connected to a conduit 40 which carries working fluid 32 back to reservoir 30. A valve 42 is located in conduit 40. A valve actuator 44 is provided to open and shut valve 42. Fluid isolator 24 is connected to conduit 40 by a conduit 52 by means of a T-junction 50 at a point a distance D upstream from valve 42. Conduits 34, 40 and 52 are preferably thick-wall pipe.

Driving system 22 operates as follows. Pump 36 pumps working fluid 32 continuously through conduit 40. With valve 42 open, working fluid 32 flows with a velocity V through conduit 40. Valve actuator 44 periodically suddenly closes valve 42 to substantially or completely block the flow of working fluid 32 through conduit 40. The sudden blockage of working fluid 32 in conduit 40 creates a water hammer pressure pulse which propagates upstream in conduit 40 from valve 42. The generation of water hammer pulses is discussed in many texts on fluid mechanics including, for example, R. L. Daugherty and J. B. Franzini, *Fluid Mechanics With Engineering Applications*, pages 425–431 McGraw Hill Book Company, 1977.

The magnitude of the water hammer pressure pulse is determined by the velocity V, the compressibility of the working fluid 32, the speed at which valve 42 is closed, the degree of closure of valve 42 and the speed of sound in working fluid 42, among other factors. Under ideal circumstances, when valve 42 closes fully, the magnitude of the water hammer pressure pulse is given by:

$$p_h = Qc_p V \qquad (1)$$

where $p_h$ is the pressure of the water hammer pulse, p is the density of working fluid 32, and $c_p$ is the velocity at which the water hammer pulse travels in conduit 40. By increasing the velocity V of working fluid 32 in conduit 40, making conduit 40 rigid, and closing valve 42 completely and very quickly the intensity of high pressure acoustic pulses generated by driving circuit 22 may be maximized.

The high pressure pulse created by the water hammer propagates upstream from valve 42 until it reaches T-junction 50. The high pressure pulse propagates into fluid isolator 24 through conduit 52. It can be appreciated that the distance D determines the length of each water hammer pulse. In general, increasing D increases the length of water hammer pulses generated by hydraulic craving system 22 and increases the amount of energy that each pulse is capable of delivering. Increasing D also tends to reduce the frequency at which hydraulic driving system 22 can generate water hammer pulses. To generate the same pulses with an electromechanical transducer such as a magnetostrictive transducer would require an impractically large transducer having an impractically long travel.

Hydraulic driving system 22 has been described so far as a closed circuit. Hydraulic system 22 could equally well comprise an open circuit wherein working fluid 32 is simply discharged, or diverted to some other use, after exiting valve 42. A closed circuit is generally preferable because it avoids wasting working fluid 32. The purpose of pump 36 and motor 38 is to feed fluid 32 into conduit 40 under pressure. Pump 36 and motor 38 may be replaced with any means for driving working fluid 32 into conduit 40 with sufficient velocity to create water hammer pulses as described above.

The purpose of fluid isolator 24 is to prevent working fluid 32 from commingling with fluid 27 inside cavitation chamber 26. In some applications working fluid 32 may be the same as fluid 27. In such cases, fluid isolator 24 may not be needed and conduit 52 may be connected directly to cavitation chamber 26.

Fluid isolator 24 comprises a body 60 within which is mounted a fluid impervious membrane 62. Water hammer pressure pulses which propagate into fluid isolator along conduit 52 are transmitted through membrane 62, which is preferably acoustically transparent. Acoustic pulses pass substantially unattenuated through membrane 62 into a conduit 63 which leads into cavitation chamber 26. Membrane 62 is preferably situated inside a chamber 64 in body 60 which is larger in diameter than conduits 52 and 63. Chamber 60 preferably tapers to join conduits 52 and 63.

From the foregoing description it can be seen that an advantage of the invention is that the acoustic pulses are generated directly in a fluid medium which may be well matched, or even identical to the liquid 27 in cavitation chamber 26. There are therefore only minimal losses involved in coupling the acoustic pulses to cavitation chamber 26.

Connecting conduit 52 directly to cavitation chamber 26 is advantageous, where it is possible, because it eliminates fluid isolator 24 as a potential cause of losses and couples the pressure pulses generated in driving system 22 directly to cavitation chamber 26. When working fluid 32 is the same as fluid 27 and fluid isolator 24 is omitted there is no place where the high pressure pulses generated by hydraulic system 22 are transmitted from one medium to another and, therefore, there are no losses associated with imperfect acoustical coupling between different media in the path from hydraulic system 22 to cavitation chamber 26.

Cavitation chamber 26 comprises a chamber which, for ease of construction, is preferably formed from a segment of pipe 70 closed at each end. End walls 72, 74 of chamber 26 are acoustically reflective. For example, end walls 72, and 74 may be fabricated from thick steel plates. While in the embodiment of FIG. 1, it is end walls 72, and 74 which are acoustically reflective, opposed acoustically reflective members may be placed inside chamber 26 instead of, or in addition to, making end walls 72, 74 acoustically reflective. Conduit 63 passes through end wall 72 at point 75 and is in fluid communication with the interior of chamber 26.

Chamber 26 is preferably equipped with one or more inlets 76 for introducing substances into chamber 26 and one or more outlets 77 for withdrawing substances from chamber 26.

In operation, water hammer pulses are developed in hydraulic driving system 22, as described above. The high pressure water hammer pulses are generated periodically at first frequency FIG. 1 by valve actuator 44. The high pressure pulses pass through fluid isolator 24 into cavitation chamber 26. At point 75 the high pressure pulses emerge into chamber 26. The end of conduit 63 at point 75 acts generally like a point acoustic source if it is small with respect to the diameter of pipe 70). Spherical acoustic wave fronts, which are indicated schematically in FIG. 1 propagate into cavitation chamber 26.

Acoustic waves propagate into fluid 27 in chamber 26 and are reflected back and forth in chamber 26 with a second frequency $f_2$ determined by the formula:

$$f_2 = \frac{c_c}{2L} \quad (2)$$

where $c_c$ is the speed of sound in fluid 27 within chamber 26 and L is the length of chamber 26. This effectively multiplies the frequency of acoustic pulses generated by hydraulic driving system 22. For example, hydraulic driving system 22 may produce pulses at a rate of 100 Hz. If cavitation chamber 26 is one meter long and the speed of sound in the fluid inside chamber 26 is 1500 m/s, then the frequency of the acoustic signal at a point in cavitation chamber 26 will be 1500/2=750 Hz.

Each subsequent acoustic pulse generated by hydraulic driving system 22 creates its own set of waves which reverberate in cavitation chamber 26. Waves created by different acoustic pulses are not necessarily in phase with each other. This results in a complicated, changing, interference pattern of acoustic waves in chamber 26. The resulting acoustic signal in chamber 26 has frequency components much higher than 750 Hz. The various reflected and unreflected acoustic wave fronts propagating inside cavitation chamber 26 interact with each other. In some cases two or more wave fronts interfere constructively to cause very high acoustic amplitudes at points inside chamber 26.

Figure 2:
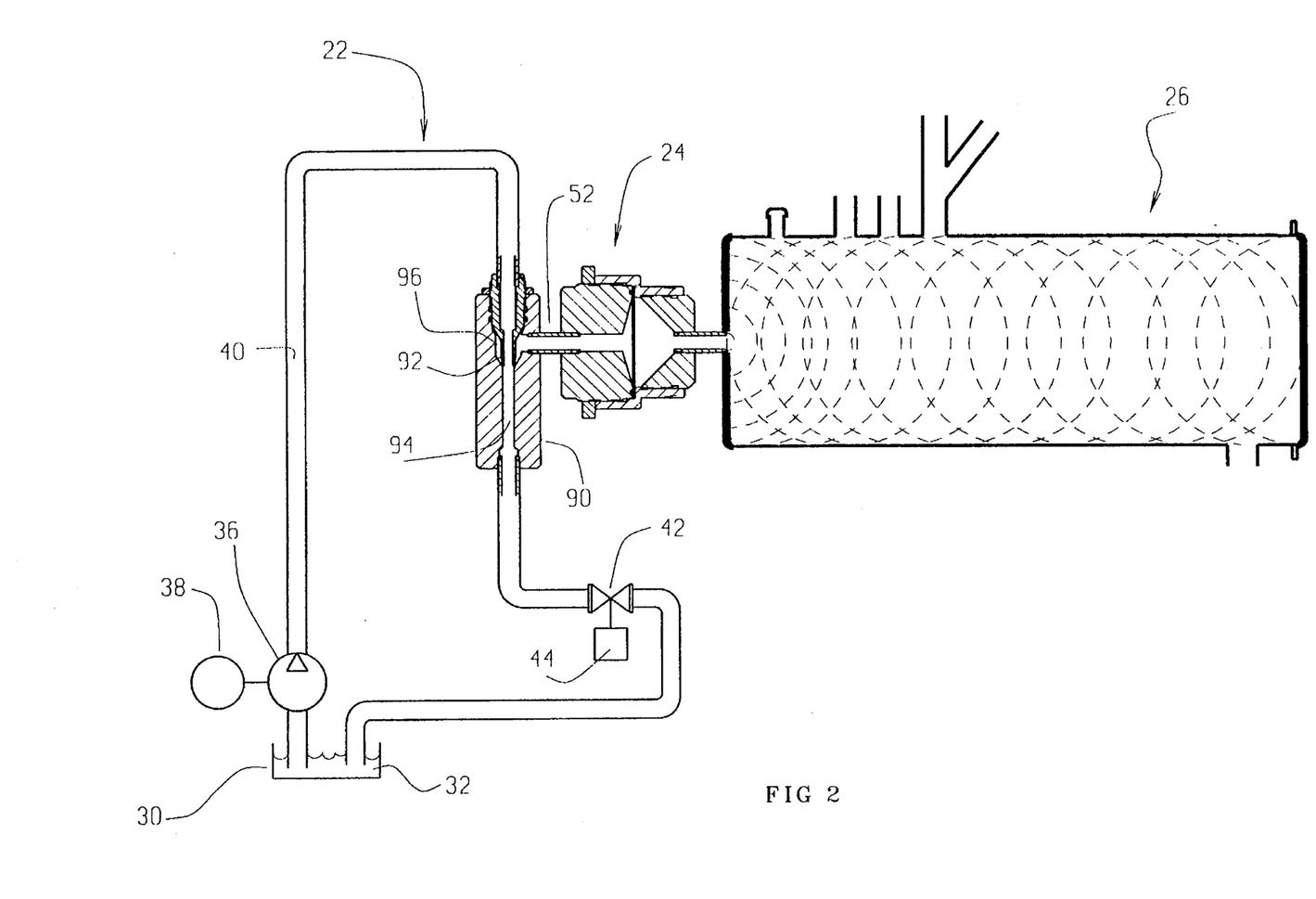
FIG. 2 shows a cavitation chamber according to the invention driven by an alternative hydraulic driving system.

FIG. 2 shows an alternative embodiment of apparatus 20 in which T-joint 50 has been replaced with a venturi unit 90. Venturi unit 90 comprises a nozzle 92 which is connected to conduit 40 at the upstream end of venturi unit 90. Nozzle 92 is directed into a narrow portion 94 of conduit 40 which acts as a mixing area within venturi unit 90. Conduit 52 is connected to an annular chamber 96 surrounding nozzle 92. Chamber 96 is in fluid communication with conduit 40.

Venturi unit 90 functions as an aspirator or "jet pump" to reduce the pressure inside treatment chamber 26 when working fluid 32 is flowing with a significant velocity through venturi unit 90. The flow of working fluid reduces the pressure in annular chamber 96. This, in turn, reduces the pressure in chamber 26. When valve 42 is suddenly closed, a pressure pulse propagates upstream into chamber 96 and along conduit 52 into cavitation chamber 26 as described above. Venturi unit 90 increases the range of variation of pressure inside cavitation chamber 26. The low pressures which result when venturi unit 90 is functioning as an aspirator promote the formation of cavitation bubbles in cavitation chamber 26. This, in turn, enhances the effectiveness of cavitation chamber 26 in the treatment of materials.

With the embodiment of FIG. 2 the average pressure within cavitation chamber 26 may be reduced by adjusting valve actuator 44 to leave valve 42 open for longer periods so that venturi unit 90 spends a higher proportion of each cycle operating as an aspirator. If valve 42 is kept open long enough, and the velocity of working fluid 32 is high enough, then a partial vacuum may be created within cavitation chamber 26. This is useful in enhancing cavitation in fluid 27. If the average ambient pressure in cavitation chamber 26 is made low enough then the apparatus of FIG. 2 may be used for degassing fluid 27.

Figure 3:
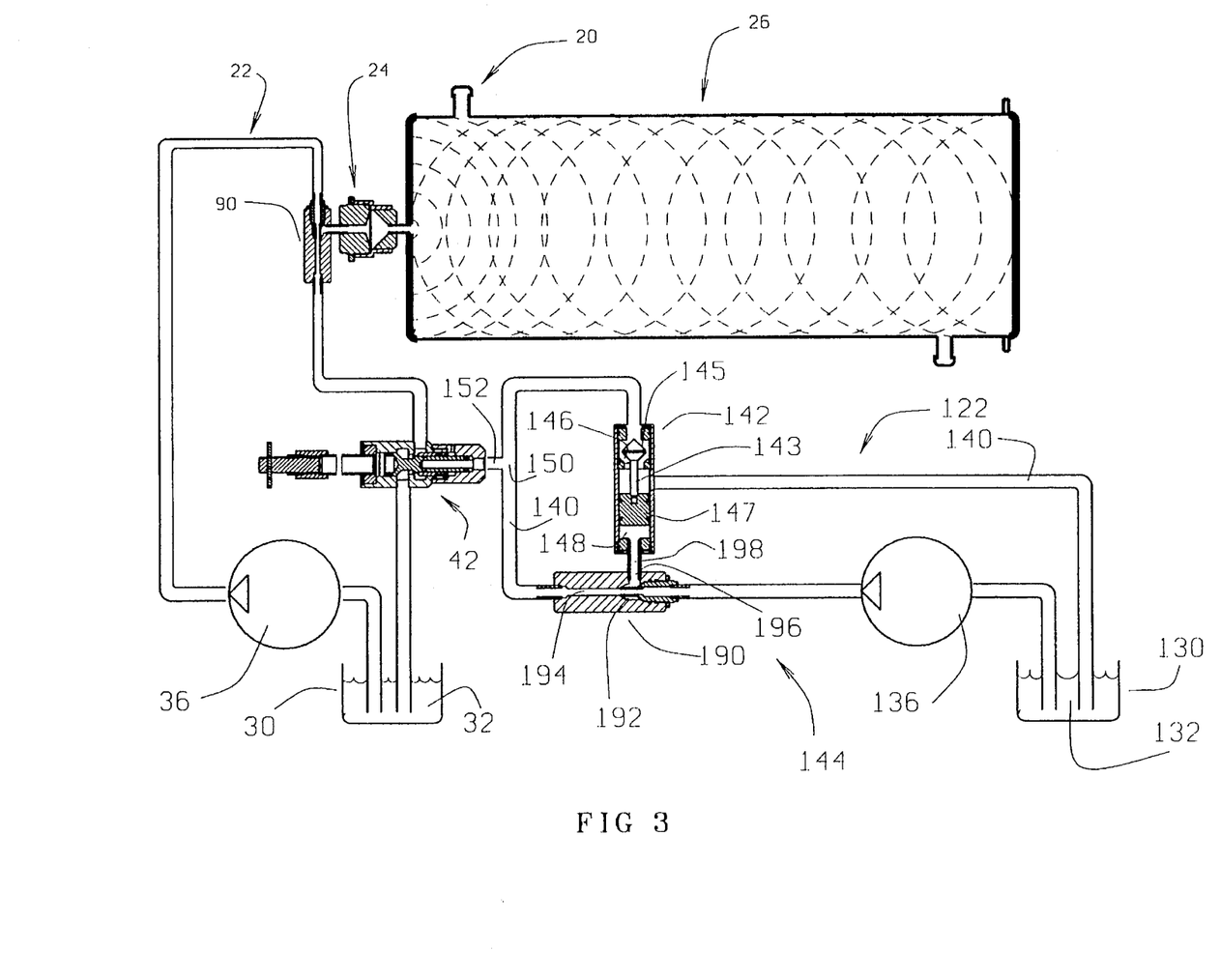
FIG. 3 shows the hydraulic driving system of FIG. 2 with an alternative form of hydraulic valve actuator.
Figure 4:
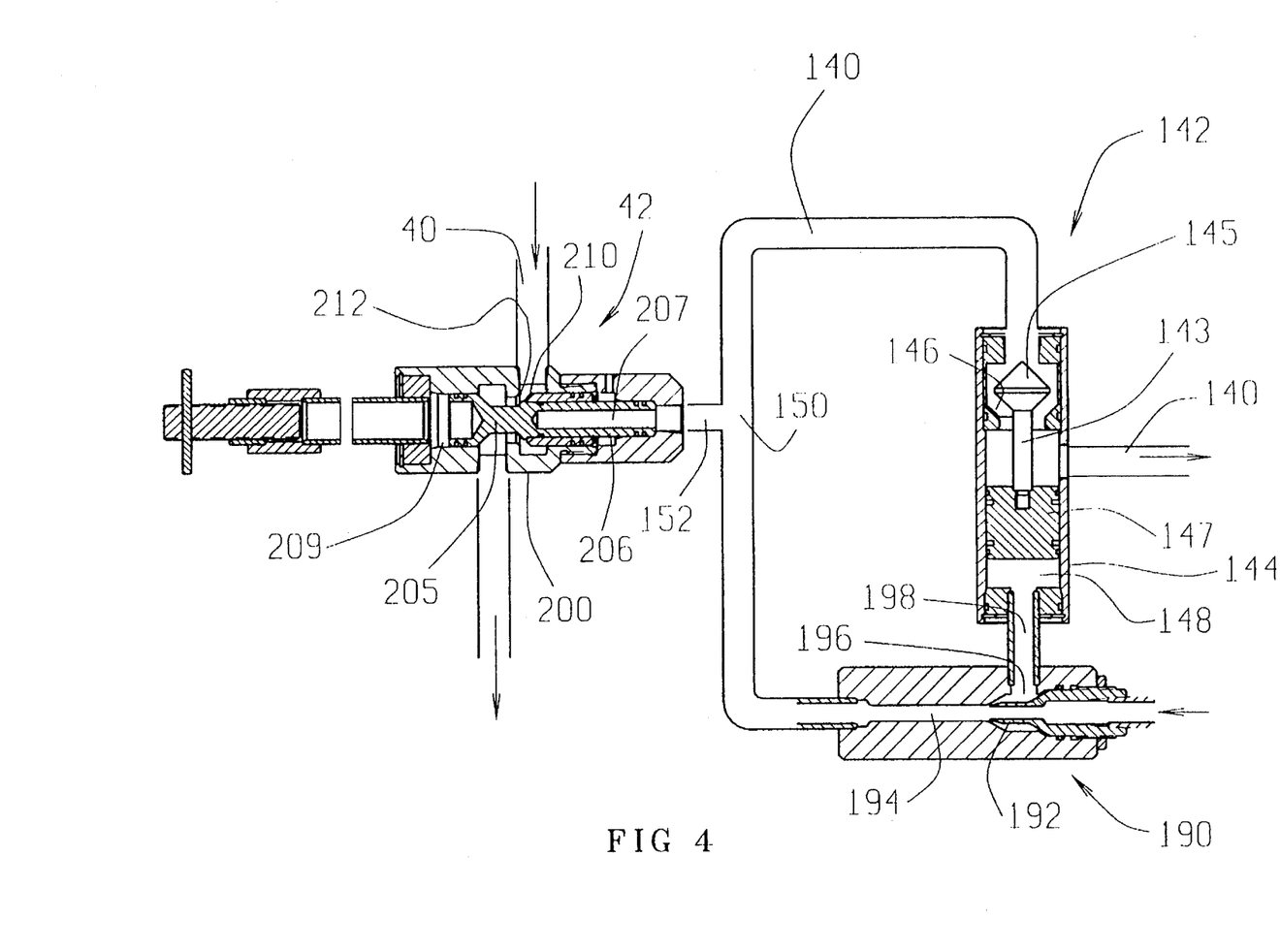
FIG. 4 is a detailed schematic view of the valve actuator of FIG. 3.

Valve actuator 44 may be an electronically operated solenoid or any other known mechanism for rapidly opening and closing valve 42. FIGS. 3 and 4 show an apparatus 20 comprising a preferred structure 144 for valve actuator 44. The valve actuator 144 shown in FIG. 3 comprises a second hydraulic circuit 122. Hydraulic circuit 122 generates pressure pulses which suddenly shut valve 42.

Hydraulic circuit 122 comprises a reservoir 130 containing a working fluid 132. Pump 136 pumps working fluid 132 through a conduit 140. A valve 142 is provided in conduit 140 downstream from a T-junction 150. Conduit 140 is connected to valve 42 by a conduit 152 which extends from T-junction 150.

If valve 142 is closed while fluid 132 is flowing through conduit 140 then a pressure pulse is generated in conduit 140 which propagates upstream from valve 142. The pressure pulse reaches valve 42 through conduit 152 and quickly closes valve 42.

Valve 142 is opened and shut by means which include a venturi unit 190 upstream from T-junction 150. In operation, pump 136 pumps fluid 132 through conduit 140. Valve 142 comprises a shuttle 143 which can slide inside a valve body 144. A valve member 145 which can bear against a valve seat 146 in valve body 144 is mounted at one end of shuttle 143. A piston 147 is mounted at a second end of shuttle 143. Piston 147 is sealingly and slidably mounted inside valve body 144 to define a chamber 148 at one end of valve body 144.

Valve 142 opens when shuttle 143 slides away from chamber 148 so that fluid 132 can flow between valve member 145 and valve seat 146. Valve 142 closes when shuttle 143 slides toward chamber 148 so that valve member 145 seals against valve seat 146. When valve 142 is open, fluid 132 pumped by pump 136 flows through venturi unit 190 past T-junction 150, through valve 142 and back to reservoir 130.

Venturi unit 190 functions in a manner identical to venturi unit 90 which is described above. Fluid entering venturi unit 190 flows through a nozzle 192 which is directed into a constricted portion of 194 of conduit 140. An annular chamber 196 surrounds nozzle 192. Annular chamber is connected to chamber 148 of valve 142 by a conduit 198. When fluid 132 flows rapidly through venturi unit 190 the pressure in chamber 148 is reduced. This draws shuttle 143 towards chamber 148 until valve 142 closes. When valve 142 closes a water hammer pulse is created which propagates upstream in conduit 140 from valve 142.

When the water hammer pulse reaches T-junction 150 it propagates along conduit 152 into valve 42 to operate valve 42 as described above. The water hammer pulse also propagates upstream in conduit 140 past T-junction 150 until it reaches venturi unit 190. In venturi unit 190 the high pressure of the water hammer pulse travels through conduit 198 into chamber 148 where it suddenly forces shuttle 143 away from chamber 148, thereby opening valve 142. When valve 142 opens, fluid 132 begins to flow through conduit 140 and the cycle repeats itself.

As shown in FIG. 4, valve 42 comprises a body 200 in which is slidably mounted a spool 205. Spool 205 has one end 206 projecting into a chamber 207 which is connected to conduit 152. End 206 of spool 205 is sealingly mounted within valve body 200. Spool 205 is biased toward chamber 207 by a spring 209. A sealing surface 210 on spool 205 can be brought to bear on a valve seat 212 by sliding spool 205 away from chamber 207.

When a water hammer pulse propagates along conduit 152 into chamber 207, the pressure in chamber 207 forces spool 205 away from chamber 207, thereby suddenly closing valve 42. After the water hammer pulse passes, spring 209 forces spool 205 toward chamber 207, thereby reopening valve 42. Valve actuator 144 can close valve 42 very rapidly, thereby promoting a vigorous water hammer within conduit 40.

Figure 5:
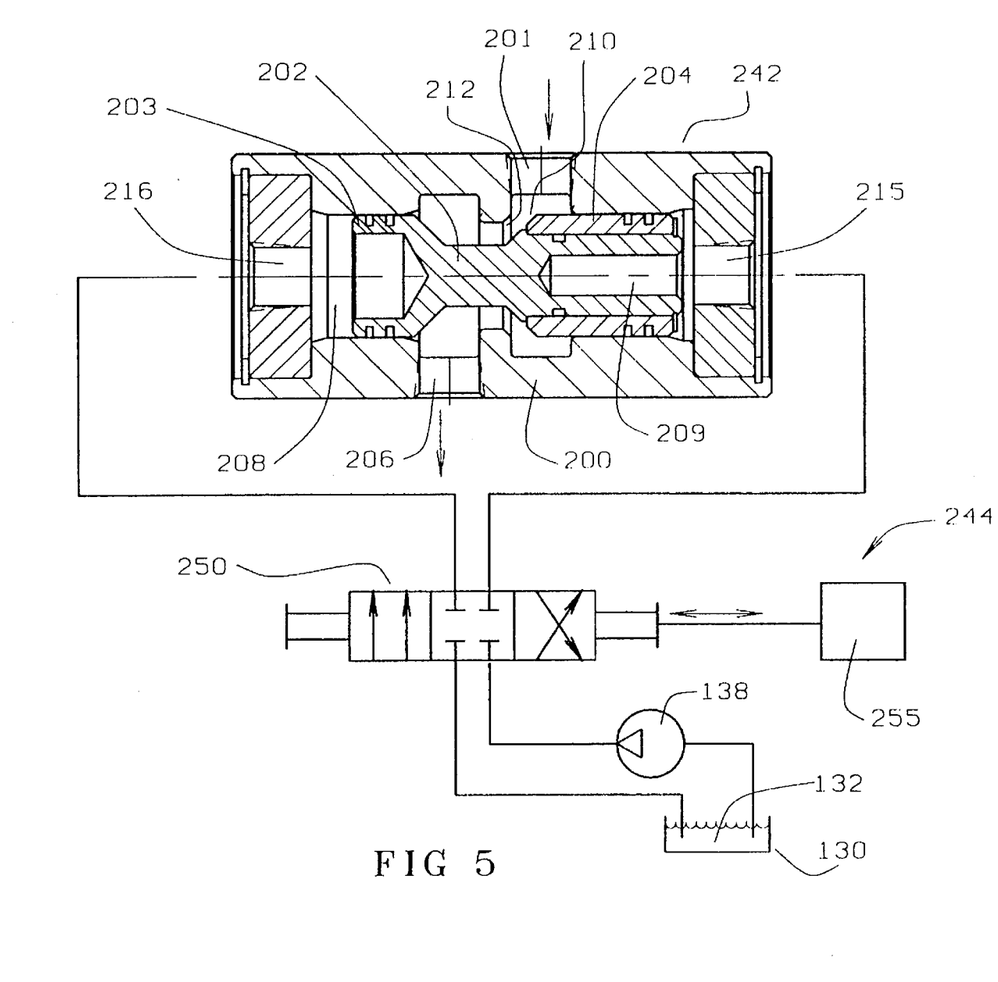
FIG. 5 is a schematic view of an alternative hydraulically operated valve for use with the apparatus of FIGS. 1 and 2.

FIG. 5 shows a schematic view of a alternative valve actuator 244 and valve 242. Valve 242 comprises a valve body 200 having a spool 202 slidably mounted in a cavity within valve body 200. Spool 202 has end portions 203, 204, which are sealingly and slidably mounted within the cavity of valve body 200. Chambers 208 and 209 are defined inside valve body 200 by ends 203 and 204 of spool 202. The volumes of chambers 208 and 209 vary depending upon the position of spool 202. Chambers 208 and 209 are each connected to the hydraulic circuit which comprises valve actuator 244.

The central portion of spool 202 has a sealing surface 210 adjacent a valve seat 212. When spool member 202 is moved fully toward chamber 208, sealing surface 210 is in contact with valve seat 212 and valve 242 is dosed. When spool member 202 is moved toward chamber 209, fluid can flow between sealing surface 210 and valve seat 212 and valve 242 is open.

Valve actuator 244 comprises a source of pressurized hydraulic fluid which, for example, comprises a pump 138 which draws hydraulic fluid 132 from a reservoir 130, a solenoid valve 250 and an electronic valve driving unit 255. Valve 250 may be, for example, a Sturman Industries model SI-V-4 Digital 4-way valve and craver available from Sturman Industries of Camarillo Calif.

Valve 250 has a first position in which pressurized hydraulic fluid is connected to chamber 209 and hydraulic fluid in chamber 208 is allowed to drain into reservoir 130. When valve 250 is in the first position, valve 242 closes. Valve 250 has a second position in which pressurized hydraulic fluid is connected to chamber 208 and hydraulic fluid in chamber 209 is allowed to drain into reservoir 130. When valve 250 is in the second position. Valve 242 is opened.

Electronic driver 255 may be replaced with any actuation device capable of rapidly actuating valve 250 between its first and second positions to rapidly open and close valve 242. Valve 250 preferably has a third intermediate position in which chambers 208 and 209 are both isolated from pump 138 and reservoir 130. When valve 250 is in the intermediate position, then the position of spool 202 does not change and allows fluid 132 to continue to flow through pump 238.

Figure 6:
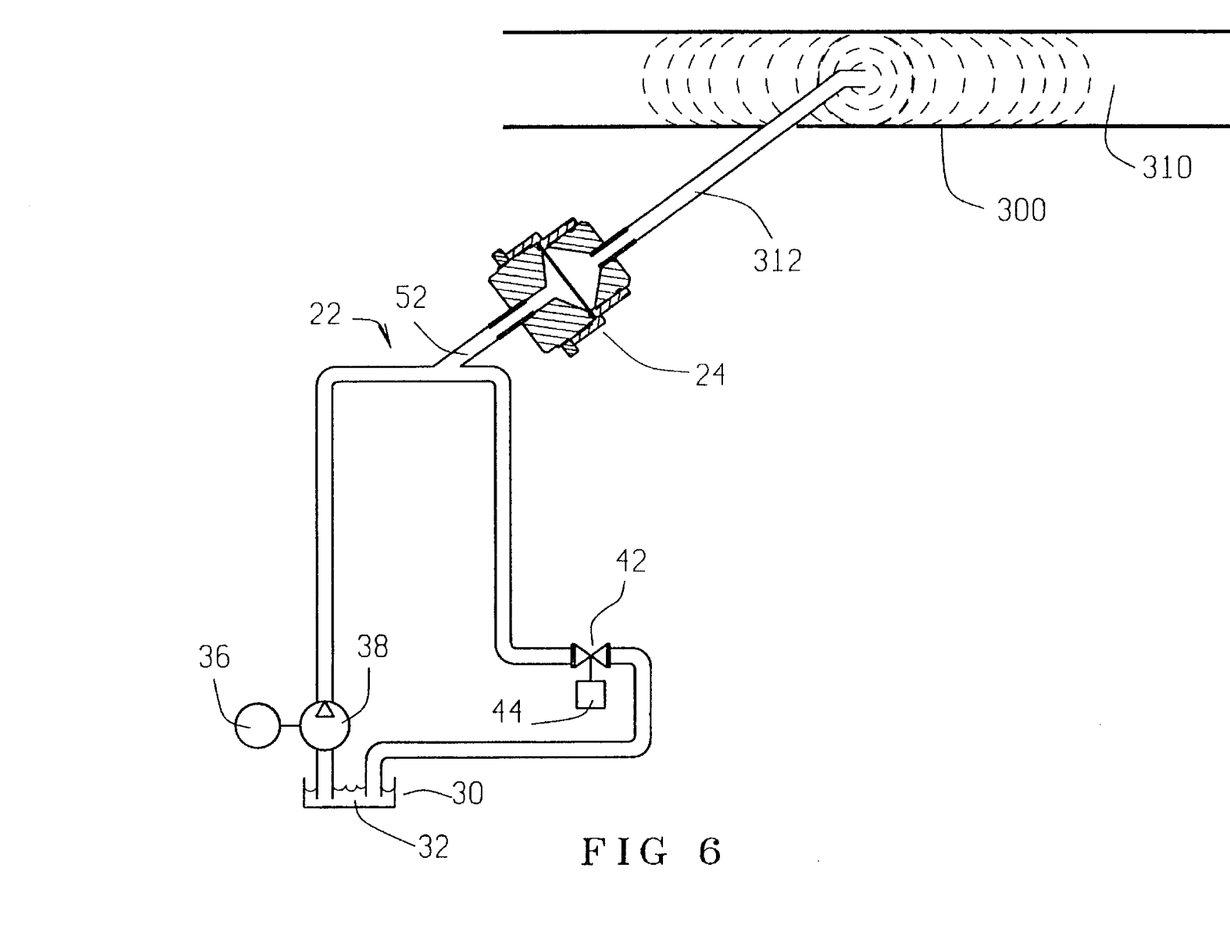
FIG. 6 is an alternative embodiment of the invention adapted to treat a fluid material flowing in a pipe with a high intensity acoustic signal.

FIG. 6 shows an alternative embodiment of the invention adapted to treat a fluid or slurry 310 flowing in a pipe 300. Such treatment may be desirable, for example, for reducing viscosity of material 310. In FIG. 6 a hydraulic driving system 22 is coupled by means of a fluid isolator 24 and a conduit 312 to pipe 300. Sonic impulses travel from hydraulic drive system 22 to fluid isolator 24 and conduit 312 into fluid 310. Conduit 312 may extend to a central portion of pipe 300 as shown in FIG. 6, or may terminate at the wall of pipe 300. Conduit 312 acts essentially as a point source of very intense acoustical pulses within pipe 300.

Figure 7:
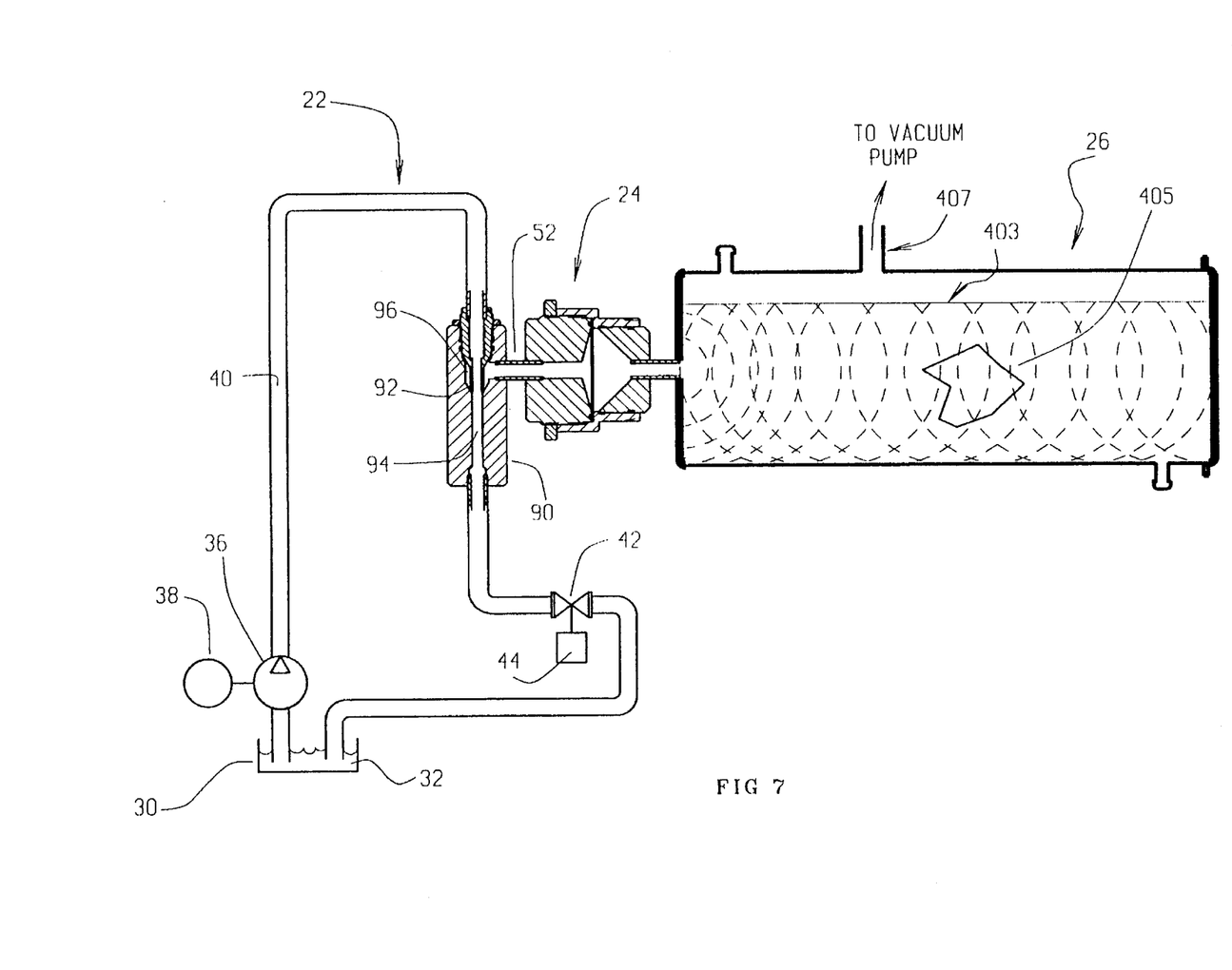
FIG. 7 is a schematic view of a cavitation chamber according to the invention equipped with a vacuum pump and an aspirator for increasing the vigour of cavitation.

FIG. 7 shows a variation of apparatus 20 in which the pressure inside chamber 26 is reduced to promote cavitation in fluid 27. Chamber 26 is filled with fluid 27 up to a level 403. A vacuum port 407 connected to a vacuum pump (not shown) enters chamber 26 above level 403. By reducing the pressure in chamber 26 cavitation bubbles are formed more readily in fluid 27. This, in turn, increases the rate at which the cavitation bubbles can produce physical effects, for example, cleaning an object 405. In the embodiment of FIG. 7, fluid isolator 24 is necessary to prevent fluid 27 from being sucked out of chamber 26. The same effect may be achieved by timing the operation of valve 42 in circuit 22, as discussed above, so that aspirator 90 creates a partial vacuum in cavitation chamber 26. The embodiment shown in FIG. 7 may also be used for degassing fluid 27.

Figure 8:
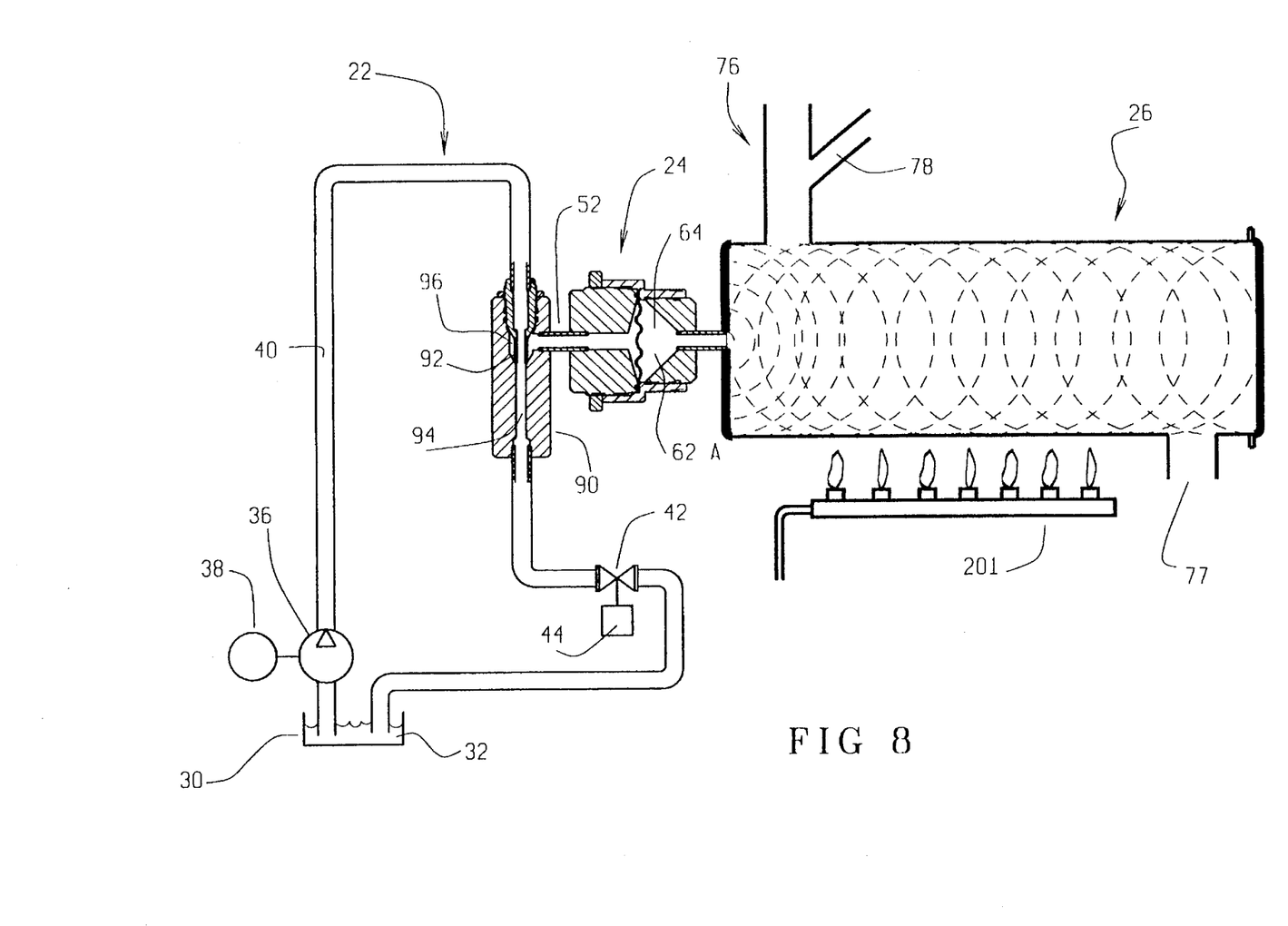
FIG. 8 is a schematic view of the apparatus of FIG. 1 modified for treating materials by applying both heat and acoustic energy.

FIG. 8 shows a further alternative embodiment of apparatus 20 which is adapted for treating materials by both cavitation and heating. In FIG. 8, fluid isolator 24 has a diaphragm comprising a thin metallic bellows 62A. Although bellows 62A is not as acoustically transparent as diaphragm 62 shown in FIG. 1, bellows 62A is better able to withstand the high temperatures and pressure differentials between working fluid 32 and fluid 27 which are encountered in some applications. A heater 201 may be provided to heat chamber 26 and its contents.

Applications

Apparatus 20 can be used to generate high intensity acoustic fields and vigorous cavitation within fluid 27. As such, apparatus 20 may be used for mixing fluids or slurries. For mixing purposes different fluids or slurries to be mixed may be introduced into cavitation chamber through one or more inlets 76. Inlets 76 may have junctions 78 upstream from chamber 26 for mixing fluids or slurties together before they are introduced into chamber 26. The mixed fluids or slurties are withdrawn from cavitation chamber 26 through an outlet 77.

Apparatus 20 may also be used for promoting certain chemical reactions. Intense acoustic fields can promote certain chemical reactions. For example, the high energy acoustic fields may be used to break down chemicals present in the fluid in cavitation chamber 26. Ozone may be optionally added into chamber 26 to assist in the breakdown of such chemicals. A particular application of cavitation chamber 26 is the treatment of contaminated soft. In this application a slurry of contaminated soft is introduced into cavitation chamber 26 through inlet 76. Ozone is preferably added to the slurry at junction 78. The treated slurry is removed at outlet 77.

Apparatus 20 may be used to promote catalyzed chemical reactions. Chemicals to be reacted are introduced into chamber 26 through inlets 76. A liquid catalyst may be added through inlets 76 or a solid catalyst may be placed in cavitation chamber 26. For example, in a preferred embodiment, acoustically transparent screens 80 of a solid catalyst may be placed transversely in chamber 26.

Apparatus 20 may also be used for abrading surfaces. In this application, chamber 26 is filled with an abrasive slurry. When the abrasive slurry is agitated by cavitation in chamber 26 it polishes or grinds the surfaces of objects inside chamber 26.

The intense acoustic pulses developed by driving circuit 22 may be used to treat materials in cavitation chamber 26 by killing bacteria or other organisms associated with the materials. In such disinfecting applications small amounts of ozone, chlorine or other disinfecting chemical may be added to fluid 27 to make the disinfection more complete. Cavitation in chamber 26 acts directly on organisms in chamber 26 and also agitates fluid 27 so that disinfectant chemicals in fluid 27 are brought into contact with any organisms in chamber 26.

The embodiment of apparatus 20 shown in FIG. 8 may be used to enhance the production of cellulose fibres from wood chips in the production of pulp. For such applications cavitation chamber 26 is preferably heated, by heater 202. Wood chips suspended in water are introduced into chamber 26 through inlet 76 and broken down by cavitation in chamber 26. Preferably chemicals for breaking down the wood chips, such as calcium bisurfate, caustic soda or caustic soda and sodium surfate are also added to chamber 26. The agitation in chamber 26 caused by the pressure pulses from driving system 22 enhances the effectiveness of such chemicals so that lower concentrations than normal may be used. If the acoustic waves within chamber 26 are sufficiently intense then the wood chips may be broken down sufficiently by the acoustic waves and resulting cavitation to avoid the use of chemicals entirely.

A related application of apparatus 20 is in breaking up waste paper for recycling. The waste paper may be shredded, mixed with water or another suitable liquid, and introduced into chamber 26. The acoustic waves and resulting cavitation in chamber 26 separate the cellulose fibers in the shredded paper.

There are major deposits of oil in the form of off sands which comprise crude petroleum thoroughly mixed with and tightly stuck to sand. Using current technology it is costly to separate the oil from the sand. The apparatus shown in FIG. 8 may be used to remove oil from sand. Oil sands may be mixed with water and introduced into the apparatus of FIG. 8 in the form of a thin slurry. A solvent may be added to the water or used in place of the water. The vigorous cavitation and agitation in chamber 26 dislodges particles of oil from the sand grains to which they are adhering and makes subsequent separation of the crude petroleum products from the sand more effective.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A cavitation chamber apparatus comprising:
    (a) a driving system comprising:
        (i) means for causing a liquid to flow through a first conduit from an upstream end to a downstream end;
        (ii) a valve in said first conduit for selectively substantially blocking said flow of said liquid, said valve having an open position wherein said flow is substantially unimpeded and a closed position wherein said flow is at least substantially blocked;
        (iii) an actuator for repeatedly: opening said valve; keeping said valve open for a period sufficient to allow said liquid to commence flowing through said first conduit and said valve with sufficient velocity to produce a water hammer within said first conduit when said valve closes; and closing said valve; to produce a continuous series of water hammer acoustic pulses within said first conduit;
    (b) a cavitation chamber comprising a chamber containing a liquid coupled to said hydraulic driving system; and
    (c) an acoustic coupler between said driving system and said cavitation chamber, said acoustic coupler comprising a second conduit, said second conduit having a first end connected to said first conduit upstream from said valve and a second end connected to an interior region of said cavitation chamber.

2. The cavitation chamber apparatus of claim 1 further comprising an aspirator in said first conduit wherein said second conduit is connected to a suction port of said aspirator.

3. The cavitation chamber apparatus of claim 2, wherein said aspirator comprises an inlet upstream from an outlet, a nozzle coupled to said inlet and directed into said outlet, and an annular space around an end of said nozzle wherein said second conduit is in fluid communication with said annular space.

4. The cavitation chamber apparatus of claim 3 wherein said acoustic coupler further comprises a fluid isolator in said second conduit.

5. The cavitation chamber apparatus of claim 4 wherein said cavitation chamber further comprises: first and second opposed acoustically reflective members in said cavitation chamber on two sides of said interior region.

6. The cavitation chamber apparatus of claim 5 further comprising a solid catalyst in said region between said acoustically reflective members.

7. The cavitation chamber apparatus of claim 6 wherein said catalyst is distributed on a surface of an acoustically transparent screen.

8. The cavitation chamber apparatus of claim 4 wherein said fluid isolator comprises a diaphragm blocking said second conduit.

9. The cavitation chamber apparatus of claim 8 wherein said diaphragm is acoustically transparent.

10. The cavitation chamber apparatus of claim 4 wherein said first liquid and said second liquid are different.

11. The cavitation chamber apparatus of claim 10 wherein said first liquid and said second liquid have closely matched acoustical characteristics.

12. The cavitation chamber apparatus of claim 11 wherein said first liquid has a higher cavitation threshold than said second liquid.

13. The cavitation chamber apparatus of claim 1 wherein said valve comprises a control port wherein said valve may be closed by applying fluid pressure at said control port and bias means for opening said valve in the absence of fluid pressure at said control port; and said actuator comprises a hydraulic system for generating sudden pressure pulses at said control port to suddenly close said valve.

14. The cavitation chamber apparatus of claim 13 wherein said hydraulic system comprises a third conduit; a fluid connection between a point in said third conduit and said control port; means for causing a liquid to flow through said third conduit from an upstream end to a downstream end; and a second valve for suddenly blocking flow of said liquid a distance D downstream from said point in said third conduit to cause a water hammer within said third conduit.

15. The cavitation chamber apparatus of claim 14 wherein said second valve comprises a control port, said second valve opens when an increased pressure is applied to said control port and closes when a decreased pressure is applied to said control port and said hydraulic system further comprises an aspirator in said third conduit upstream from said second valve, said aspirator having a suction port in fluid communication with said control port of said second valve.

16. The cavitation chamber apparatus of claim 15 wherein said aspirator comprises an inlet upstream from an outlet, a nozzle coupled to said inlet and directed into said outlet, and an annular space around an end of said nozzle wherein said suction port is in fluid communication with said annular space.

17. The cavitation chamber apparatus of claim 1 wherein said acoustic coupler further comprises a fluid isolator, said fluid isolator comprising a diaphragm blocking said second conduit and said apparatus further comprises a vacuum pump connected to said said cavitation chamber for reducing ambient pressure in said cavitation chamber.

18. A cavitation chamber apparatus comprising:
(a) a driving system comprising:
  (i) means for causing a liquid to flow through a first conduit from an upstream end to a downstream end;
  (ii) a valve in said first conduit for selectively substantially blocking said flow of said liquid, said valve having an open position wherein said flow is substantially unimpeded and a closed position wherein said flow is at least substantially blocked;
  (iii) an actuator for repeatedly: opening said valve; keeping said valve open for a period sufficient to allow said liquid to commence flowing through said first conduit and said valve with sufficient velocity to produce a water hammer within said first conduit when said valve closes; and closing said valve; to produce a continuous series of water hammer acoustic pulses within said first conduit;
(b) a cavitation chamber comprising a chamber containing a liquid coupled to said hydraulic driving system, said cavitation chamber further comprising: first and second opposed acoustically reflective members in said chamber on two sides of an interior region; and
(c) an acoustic coupler between said driving system and said cavitation chamber, said acoustic coupler comprising a second conduit, said second conduit having a first end connected to said first conduit upstream from said valve and a second end connected to said interior region of said cavitation chamber.

19. A method of treating a material, said method comprising the steps of:
a) providing a chamber and a conduit;
b) acoustically coupling a point in said conduit to an interior region in said chamber;
c) providing opposed acoustically reflective on two sides of said region;
d) placing said material in said region;
e) causing a liquid to flow through said conduit;
f) suddenly blocking said conduit a distance D downstream from said point to cause a water hammer in said liquid within said conduit;
g) allowing a water hammer acoustic pulse to propagate into said chamber;
h) repeatedly reflecting acoustic waves generated by said pulse between said reflective surfaces to cause cavitation in said region; and
i) repeating said steps (e) (i) (g) and (h) until said material has been sufficiently treated by said cavitation.

20. The method of claim 19 wherein said treatment comprises killing organisms on said material.

21. The method of claim 19 wherein said material comprises wood chips and said treatment comprises breaking said wood chips into fibres.

22. The method of claim 19 wherein said material comprises crude petroleum adhering to grains of said and said treatment comprises loosening adhesion between said crude petroleum and said grains of sand.

23. The method of claim 19 wherein said material comprises shredded waste paper and said treatment comprises breaking said waste paper into cellulose fibers.

\* \* \* \* \*